United States Patent
Switzer (10) Patent No.: US 11,260,619 B2
(45) Date of Patent: Mar. 1, 2022

(54) COMPOSITE PANEL SYSTEMS AND METHODS

(71) Applicant: THE BOEING COMPANY, Chicago, IL (US)

(72) Inventor: Lon E. Switzer, Marysville, WA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 16/394,153

(22) Filed: Apr. 25, 2019

(65) Prior Publication Data

US 2020/0338851 A1    Oct. 29, 2020

(51) Int. Cl.
| | |
|---|---|
| B32B 3/04 | (2006.01) |
| B32B 3/12 | (2006.01) |
| B32B 37/18 | (2006.01) |
| B32B 3/06 | (2006.01) |
| B64C 1/00 | (2006.01) |

(52) U.S. Cl.
CPC .................. *B32B 3/04* (2013.01); *B32B 3/06* (2013.01); *B32B 3/12* (2013.01); *B32B 37/182* (2013.01); *B32B 2260/046* (2013.01); *B32B 2605/18* (2013.01); *B64C 1/00* (2013.01); *B64C 2001/0072* (2013.01)

(58) Field of Classification Search
CPC .... B32B 3/04; B32B 3/06; B32B 3/12; B32B 37/182
USPC ........................................................ 52/586.2
See application file for complete search history.

(56) References Cited

U.S. PATENT DOCUMENTS

| | | | | |
|---|---|---|---|---|
| 3,890,108 | A | | 6/1975 | Welsh |
| 4,346,541 | A | * | 8/1982 | Schmitt ..................... B32B 3/28 52/309.11 |
| 4,445,956 | A | * | 5/1984 | Freeman ................ B23Q 3/086 156/154 |
| 4,572,856 | A | * | 2/1986 | Gembinski ............. B32B 27/22 428/71 |
| 5,462,786 | A | * | 10/1995 | Van Ert .................... B29C 43/18 428/171 |
| 5,800,905 | A | * | 9/1998 | Sheridan ................. B32B 15/00 428/157 |
| 5,833,304 | A | * | 11/1998 | Daniel ................ B60R 13/0225 296/214 |
| 5,857,929 | A | * | 1/1999 | Huang ................... A63B 53/14 473/549 |

(Continued)

FOREIGN PATENT DOCUMENTS

| | | |
|---|---|---|
| GB | 2220724 | 1/1990 |
| GB | 2300380 | 11/1996 |
| WO | WO 94/10406 | 5/1994 |

OTHER PUBLICATIONS

Extended European Search Report for EP 20170227.1-1010, dated Sep. 16, 2020.
Communication report EP 20170227.1-1010, dated Jul. 30, 2021.

*Primary Examiner* — Brian D Mattei
*Assistant Examiner* — Joseph J. Sadlon
(74) *Attorney, Agent, or Firm* — The Small Patent Law Group LLC; Joseph M. Butscher (57) ABSTRACT

A composite panel assembly and method of forming the same includes a core, an inner skin coupled to a first side of the core, and an outer skin coupled to a second side of the core. A peripheral edge including portions of the core, the inner skin, and the outer skin, is compressed to close a path into the core.

21 Claims, 6 Drawing Sheets

(56) References Cited

U.S. PATENT DOCUMENTS

| | | | | |
|---|---|---|---|---|
| 6,337,471 B1* | 1/2002 | Kistner | ............... | B21D 26/055 |
| | | | | 219/633 |
| 6,582,792 B1* | 6/2003 | Godbehere | ......... | B29C 66/1222 |
| | | | | 428/57 |
| 6,898,911 B2* | 5/2005 | Kornfalt | ............... | B27N 7/005 |
| | | | | 52/395 |
| 7,306,692 B2* | 12/2007 | Graham | ............. | B29C 43/3642 |
| | | | | 156/285 |
| 8,106,320 B2* | 1/2012 | Kunthady | ................. | B32B 5/18 |
| | | | | 200/302.1 |
| 8,114,329 B2* | 2/2012 | Karem | .................. | B64C 3/185 |
| | | | | 264/258 |
| 8,356,447 B2* | 1/2013 | Lach | ................ | A47G 27/0293 |
| | | | | 52/177 |
| 8,728,603 B2* | 5/2014 | Windmoller | ........... | E04F 15/10 |
| | | | | 428/60 |
| 8,764,089 B2* | 7/2014 | Preisler | .................. | B32B 27/00 |
| | | | | 296/39.3 |
| 9,017,565 B2* | 4/2015 | Joh | ........................ | B63B 25/16 |
| | | | | 216/35 |
| 9,175,703 B2* | 11/2015 | Maertens | ............... | B32B 21/02 |
| 9,446,568 B2* | 9/2016 | Larson | .................... | B32B 27/12 |
| 9,522,512 B2* | 12/2016 | Georgeson | .......... | B29C 66/7394 |
| 9,662,855 B2* | 5/2017 | Pfaffelhuber | ............. | B32B 3/28 |
| 10,442,171 B2* | 10/2019 | Fukushima | ............ | B32B 37/04 |
| 10,526,798 B2* | 1/2020 | Lombaert | ................ | B32B 5/02 |
| 2003/0079659 A1 | 5/2003 | Preisler | | |
| 2006/0102786 A1 | 5/2006 | Granzeier | | |
| 2015/0132532 A1 | 5/2015 | Preiser | | |
| 2015/0296612 A1* | 10/2015 | Gumbiowski | ......... | H05K 1/115 |
| | | | | 174/262 |
| 2020/0139664 A1* | 5/2020 | Ohara | ...................... | B32B 3/12 |

* cited by examiner

COMPOSITE PANEL SYSTEMS AND METHODS

FIELD OF EMBODIMENTS OF THE DISCLOSURE

Embodiments of the present disclosure generally relate to composite panels, and, more particularly, to methods of forming composite panel systems.

BACKGROUND OF THE DISCLOSURE

Various structures are formed from composite materials. For example, portions of aircraft, such as wings, may be formed from composite materials. The composite material may be or include a polymer matrix reinforced with fibers. The fibers may be bound together with polymers, such as epoxy. Known fibers include glass, carbon, basalt, aramid, or the like.

Internal cabins of aircraft may include numerous composite panels. Composite panels such as sidewall and doorway liners within an internal cabin typically do not include exposed core along edges. The core is covered due to aesthetics, acoustics, and to prevent, minimize, or otherwise reduce potential moisture infiltration.

In order to cover edges of a composite panel, an edge wrapping process is used. Typically, a decorative laminate is wrapped around an edge and glued to a back side of the panel.

For at least certain composite panels, an edge wrapping process is not amenable to automation. Instead, the edge wrapping process is typically performed manually. The process of manually edge wrapping a laminate around an edge of a composite panel is time and labor intensive. Moreover, such a manual edge wrapping process may be ergonomically awkward.

SUMMARY OF THE DISCLOSURE

A need exists for a system and method for efficiently covering a peripheral edge of a composite panel. Further, a need exists for a system of method for automatically covering a peripheral edge of a composite panel.

With those needs in mind, certain embodiments of the present disclosure provide a composite panel assembly including a core, an inner skin coupled to a first side of the core, and an outer skin coupled to a second side of the core. A peripheral edge including portions of the core, the inner skin, and the outer skin, is compressed to close a path into the core.

In at least one embodiment, a decorative laminate is coupled to the inner skin. The peripheral edge also includes a portion of the decorative laminate.

In at least one embodiment, the core is a honeycomb core including a plurality of interconnected honeycomb cells. The inner skin and the outer skin include one or more pre-impregnated epoxy layers.

In at least one embodiment, the peripheral edge is rounded. In at least one embodiment, the peripheral edge includes a bend.

The peripheral edge is thinner than a main portion of the composite panel assembly.

In at least one embodiment, a closeout spline couples the composite panel assembly to another composite panel assembly. In at least one embodiment, the closeout spline includes an upstanding wall, and covering ribs coupled to the wall. A distal end of the peripheral edge may be wedged between an interior surface of the upstanding wall and an exterior surface of one of the covering ribs.

Certain embodiments of the present disclosure provide a method of forming a composite panel assembly that includes providing a core, coupling an inner skin to a first side of the core, coupling an outer skin to a second side of the core, compressing a peripheral edge including portions of the core, the inner skin, and the outer skin, and closing a path into the core by the compressing.

In at least one embodiment, the method also includes coupling a decorative laminate to the inner skin. The compressing also includes compressing a portion of the decorative laminate.

In at least one embodiment, the compressing includes rounding the peripheral edge. In at least one embodiment, the compressing includes bending the peripheral edge.

The method may also include coupling the composite assembly to another composite assembly with a closeout spline. In at least one embodiment, the method also includes wedging a distal end of the peripheral edge between an interior surface of an upstanding wall of the closeout spline and an exterior surface of a covering rib of the closeout spline.

Certain embodiments of the present disclosure provide a composite panel system that includes a first composite panel assembly, and a second composite panel assembly. Each of the first composite panel assembly and the second composite panel assembly includes a core, an inner skin coupled to a first side of the core, and an outer skin coupled to a second side of the core. A peripheral edge including portions of the core, the inner skin, and the outer skin, is compressed to close a path into the core.

In at least one embodiment, the first composite panel assembly is separated from the second composite panel assembly by a gap. A closeout spline couples the first composite panel assembly to the second composite panel assembly. The closeout spline includes an upstanding wall, and covering ribs coupled to the wall. A distal end of each of the peripheral edges is wedged between an interior surface of the upstanding wall and an exterior surface of one of the covering ribs.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure provide a composite panel and a method of forming a composite panel that eliminate, minimize, or otherwise reduce a need for wrapping an edge of a laminate over and around a peripheral edge of the composite panel. In at least one embodiment, a peripheral edge of the composite panel is compressed and rounded (for example, crushed, crimped, squeezed, flattened, or the like and rounded). The compressed peripheral edge covers or otherwise blocks a path into a core, such as a honeycomb core.

In at least one embodiment, the compressed, rounded peripheral edges may be formed with automated systems. For example, shims may be coupled to a forming system that compress and round the peripheral edges. In at least one embodiment, a spline is coupled to a peripheral edge of a first composite panel assembly that couples to a peripheral edge of a second composite panel assembly.

Figure 1:
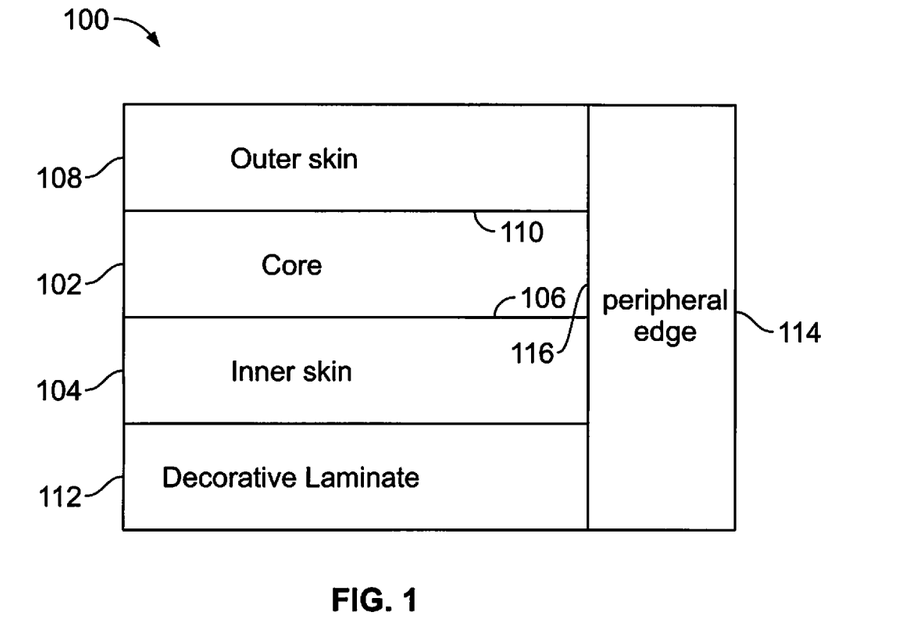
FIG. 1 illustrates a schematic block diagram of a composite panel assembly, according to an embodiment of the present disclosure.

FIG. 1 illustrates a schematic block diagram of a composite panel assembly 100, according to an embodiment of the present disclosure. The composite panel assembly 100 includes a core 102. An inner skin 104 is coupled to a first side 106 (such as an inner side facing towards an internal cabin of a vehicle) of the core 102. An outer skin 108 is coupled to a second side 110 (such as an outer side facing away from the internal cabin of the vehicle) of the core 102. A decorative laminate 112 is coupled to the inner skin 104. In at least one embodiment, the decorative laminate 112 faces the internal cabin of the vehicle, such as where passengers are seated.

At least one peripheral edge 114 of the composite panel 100 is compressed (such as crushed, flattened, rolled, squeezed, or the like). For example, peripheral portions of the outer skin 108, the core 102, the inner skin 104, and the decorative laminate 112 are compressed to close a path into at least one peripheral edge 116 of the core 102. In at least one embodiment, multiple peripheral edges 114 of the composite panel 100 are compressed. In at least one embodiment, at least one of the peripheral edges 114 is also rounded.

Figure 2:
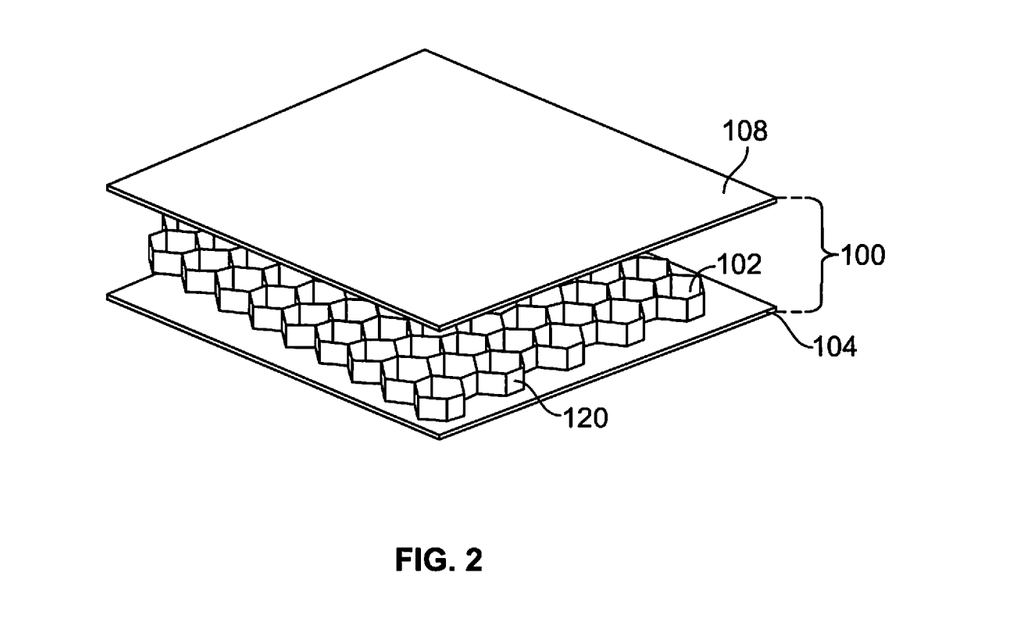
FIG. 2 illustrates a perspective exploded view of the composite panel assembly, according to an embodiment of the present disclosure.

FIG. 2 illustrates a perspective exploded view of the composite panel assembly 100, according to an embodiment of the present disclosure. The composite panel assembly 100 includes the honeycomb core 102 sandwiched between the inner skin 104 and the outer skin 108. The decorative laminate 112 (shown in FIG. 1) is not shown in FIG. 2. Further, the peripheral edges of the composite panel 110 are not compressed as shown in FIG. 2. After an initial formation of the composite panel assembly 100, at least one peripheral edge is compressed.

In at least one embodiment, the core 102 is a honeycomb core that includes a plurality of interconnected honeycomb cells 120. In at least one other embodiment, the core 102 may be a solid layer or porous foam layer. The core 102 may be formed of aramid fibers, and/or polyamides, for example. The inner skin 104 and the outer skin 108 may be or include one or more pre-impregnated epoxy resin layers that include fibers, such as fiberglass, graphite, Kevlar, and/or the like. The inner skin 104 and the outer skin 108 may be identical to one another. In at least one other embodiment, the inner skin 104 and the outer skin 108 may include more or less layers than one another.

Figure 3:
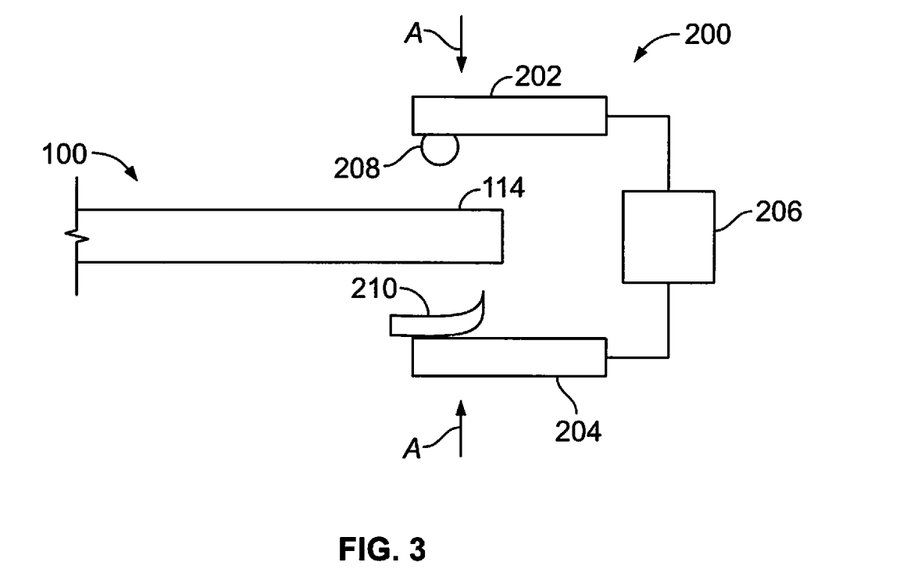
FIG. 3 illustrates a lateral view of a forming system prior to compressing a peripheral edge of the composite panel assembly, according to an embodiment of the present disclosure.

FIG. 3 illustrates a lateral view of a forming system 200 prior to compressing the peripheral edge 114 of the composite panel 100, according to an embodiment of the present disclosure. The forming system 200 may include a first forming member 202 (such as a plate, beam, press, or the like) operatively coupled to a second forming member (such as a plate, beam, press, or the like) 204, such as through an actuator 206. The actuator 206 may be a motor, hand crank, hand clamp, or the like. In at least one embodiment, a first shim 208 may be coupled to the first forming member 202, and a second shim 210 may be coupled to the second forming member 204. The shims 208 and 210 are configured to cooperate with the respective first forming member 202 and the second forming member 204 to provide a rounded contour to the peripheral edge 114 as the peripheral edge 114 is compressed between the first forming member 202 and the second forming member 204.

In order to compress the peripheral edge 114 of the composite panel assembly 100, the forming system 200 is operated (via an automatic motor, or hand operation) so that the first forming member 202 and the second forming member 204 are urged into the peripheral edge 100, sandwich the peripheral edge 114, and compress the peripheral edge 114 therebetween. The first shim 208 and the second shim 210 may be used to provide a rounded contour to the peripheral edge 114.

Figure 4:
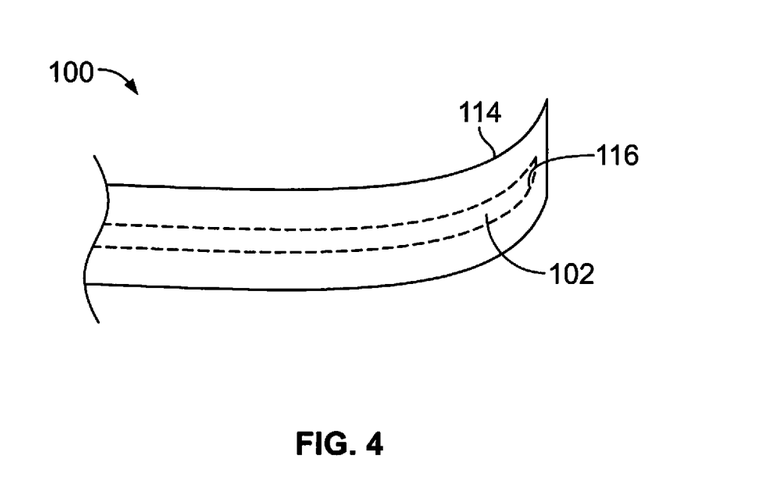
FIG. 4 illustrates a lateral view of the peripheral edge of the composite panel after being compressed by the forming system of FIG. 3.

FIG. 4 illustrates a lateral view of the peripheral edge 114 of the composite panel assembly 100 after being compressed by the forming system 200 of FIG. 3. As shown, the peripheral edge 114 has been compressed to close openings into the core 102 That is, the compressed peripheral edge 114 covers the peripheral edge 116 of the core 102. In at least one embodiment, the peripheral edge 116 of the core 102 is compressed along with the peripheral edges of the outer skin 108, the inner skin 106, and the decorative laminate 112 (shown in FIG. 1). As such, the peripheral edge 116 of the core 102 may be sealingly compressed between peripheral edges of the outer skin 108, the inner skin 106, and the decorative laminate 112, thereby closing openings into the core 102.

The composite panel assembly 100a and/or 100b includes the core 102, which may include a plurality of honeycomb cells 120. The composite panel assemblies 100a and 100b include a first surface 119 (such as an interior surface) and an opposite, second surface 121 (such as an exterior surface). As shown, the first surface 119 includes the decorative laminate 112, which may include one or more plies of laminate material. The peripheral edge 114 may include a bend 125, such that the first surface 119 is on inside of the bend 125, and the second surface 121 is on an outside of the bend 125. The decorative laminate 112 terminates at the edges for the edge(s) that is bent. The bent edges may have compressed (for example, crushed) core and are thinner than a main portion 129 of the composite panel assembly 100a and/or 100b.

Figure 5:
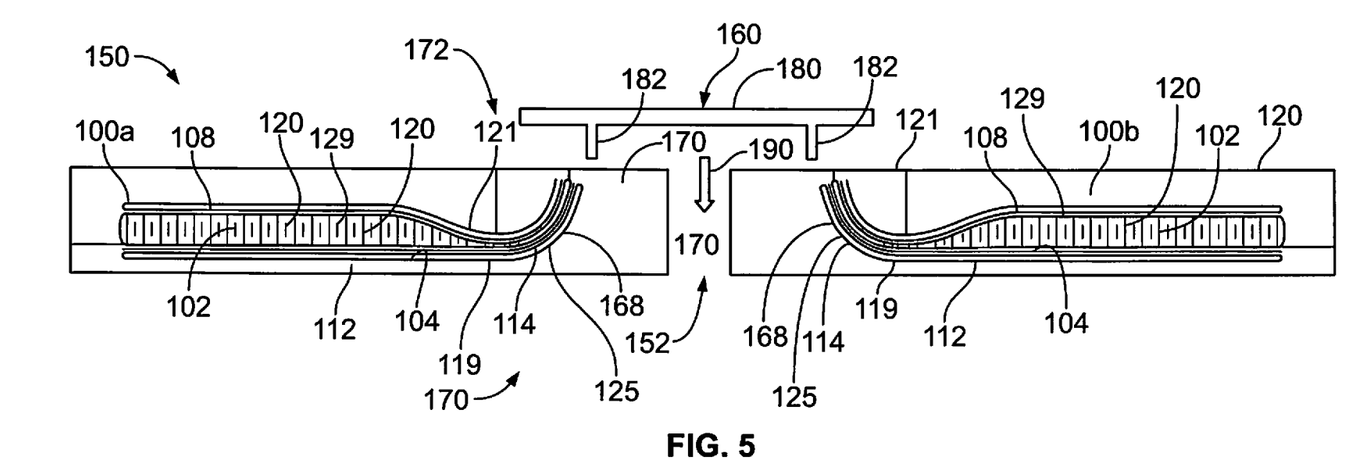
FIG. 5 illustrates a top view of a composite panel system, according to an embodiment of the present disclosure.

FIG. 5 illustrates a top view of a composite panel system 150, according to an embodiment of the present disclosure. The composite panel system 150 includes a first composite panel assembly 100a separated from a second composite panel assembly 100b through a gap 152. A closeout spline 160 may be used to couple the first composite panel assembly 100a to the second composite panel assembly 100b.

In at least one embodiment, the first composite panel assembly 100a and the second composite panel assembly 100b form portions of walls within an internal cabin of a vehicle. Each of the first composite panel assembly 100a and the second composite panel assembly 100b is formed as described with respect to FIGS. 1-4.

For the sake of clarity, the core 102 including the honeycomb cells 120 is shown as being visible, but is covered by the outer skin 108, the inner skin 104, and/or the decorative laminate 112. Each of the inner skin 104 and the outer skin 108 may include one or more plies of skin. As shown, peripheral edges 114 of the composite panel assemblies 100a and 100b are compressed and rounded. For example, an interior surface 168 of each of the composite panel assemblies 100a and 100b is compressed and rounded away from an interior side 170 (for example, a side facing a passenger cabin of a vehicle) of the composite panel system 150 towards an exterior side 172 (for example, a side facing away from the passenger cabin of the vehicle).

As shown, each composite panel assembly 100a and 100b may include a base 170 coupled to an upstanding wall 172 that upwardly extends from the base 170. For example, the upstanding wall 172 may be generally upright, while the base 170 is flat on a floor. In at least one other embodiment, the composite panel assemblies 100a and 100b may be sized and shaped other than shown. For example, the composite panel assemblies 100a and 100b may be flat panels that do not include bases. Further, the peripheral edges 114 may or may not be rounded as shown.

In at least one embodiment, the gap 152 is between 0.5 inches and 0.75 inches, which provides a spacing between panels in internal cabins of various commercial aircraft. Optionally, the gap 152 may be less than 0.5 inches, or greater than 0.75 inches.

The closeout spline 160 may be formed of an extruded material, such as a polymer, elastomeric material, or the like. In at least one embodiment, the closeout spline 160 is formed of Teflon. In at least one other embodiment, the closeout spline 160 is formed of metal.

The closeout spline 160 includes an upstanding wall 180 and inwardly directed covering ribs 182 coupled to the wall 180. For example, the covering ribs 182 may be generally perpendicular to the wall 180. The wall 180 and the covering ribs 182 may be generally as tall as the composite panel assemblies 100a and 100b. Optionally, the closeout spline 160 may be taller or shorter than one or both of the composite panel assemblies 100a and/or 100b. In at least one embodiment, the composite panel system 200 may not include the closeout spline 160.

In order to secure the closeout spline 160 to the first composite panel assembly 100a and the second composite panel assembly 100a, the closeout spline 160 is urged into the peripheral edges 114 in the direction of arrow 190.

Figure 6:
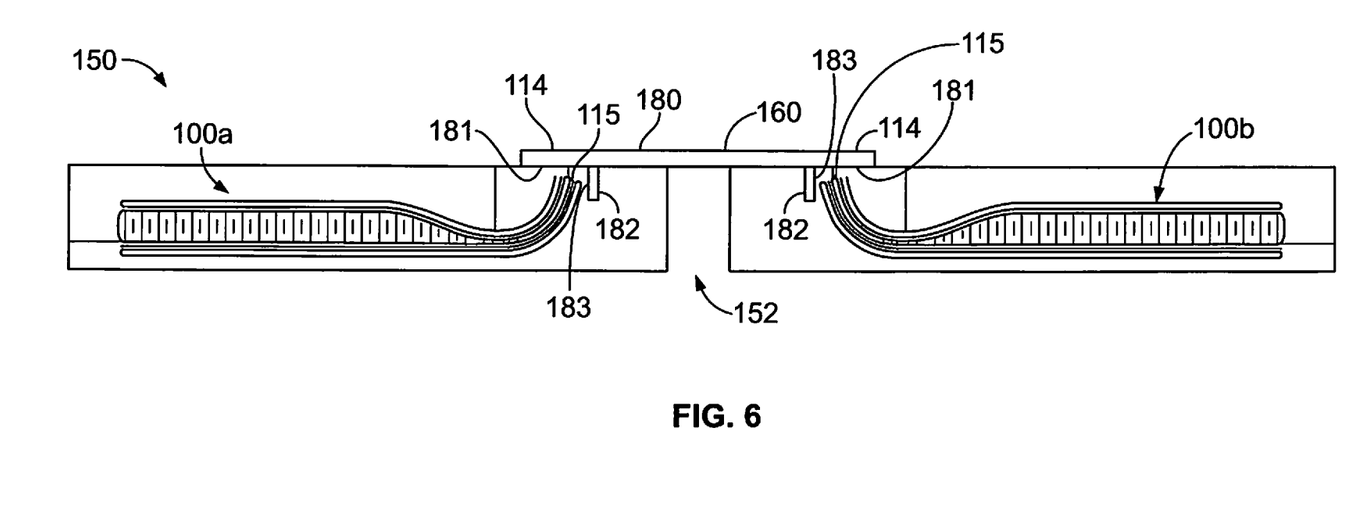
FIG. 6 illustrates a top view the composite panel system having a closeout spline that covers a gap between a first composite panel assembly and a second composite panel assembly, according to an embodiment of the present disclosure.

FIG. 6 illustrates a top view the composite panel system 150 having the closeout spline 160 that covers the gap 152 between the first composite panel assembly 100a and the second composite panel assembly 100b, according to an embodiment of the present disclosure. As shown, the distal ends 115 of the peripheral edges 114 may be wedged between an interior surface 181 of the wall 180 of the spline 160, and an exterior surface 183 of a covering rib 182. In this manner, the closeout spline 160 closes the gap 152 between the composite panel assembly 100a and the composite panel assembly 100b, and further covers any potential passage into the composite panel assemblies 100a and 100b through the distal ends 115.

The peripheral edges 114 are compressed, as described herein. For example, the peripheral edges 114 may be over-crushed, such as via the forming system 200 shown in FIG. 3. Compression of the peripheral edges 114 provides a consistent, smooth edge (which may be rounded via the shims 208 and 210) that is aesthetically pleasing, particularly within an internal cabin of a vehicle.

As noted, the composite panel assemblies 100a and 100b may provide interior walls within an internal cabin of a vehicle, such as a commercial aircraft.

Figure 7:
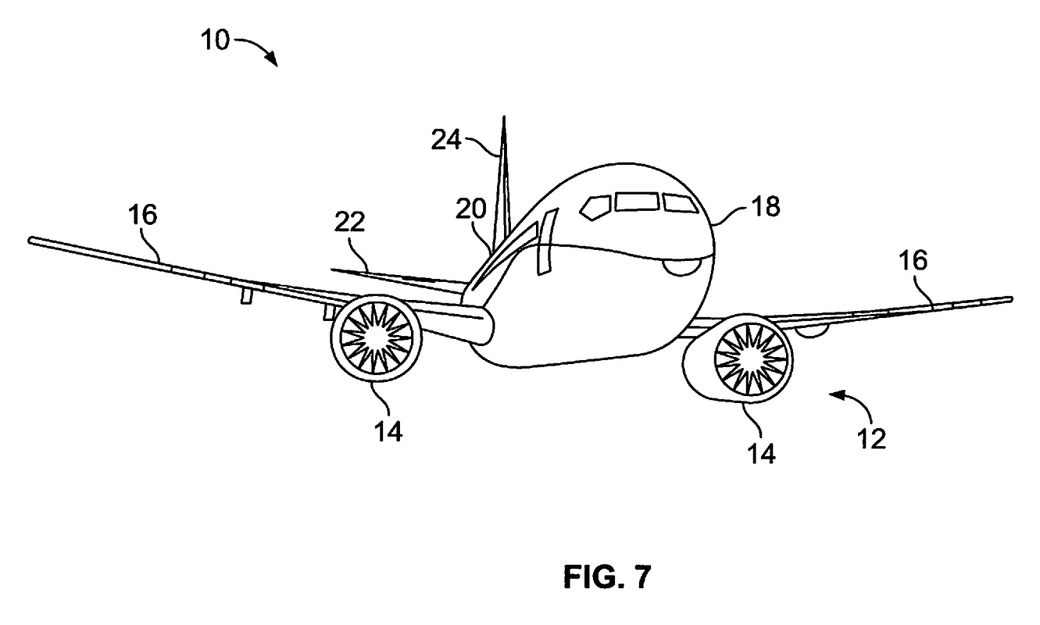
FIG. 7 illustrates a perspective front view of an aircraft, according to an embodiment of the present disclosure.

FIG. 7 illustrates a perspective top view of a vehicle, such as an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24.

The fuselage 18 of the aircraft 10 defines an internal cabin, which may be defined by interior sidewall panels that connect to a ceiling and a floor. The internal cabin may include a cockpit, one or more work sections (for example, galleys, personnel carry-on baggage areas, and the like), one or more passenger sections (for example, first class, business class, and economy sections), and an aft section in which an aft rest area assembly may be positioned. Overhead stowage bin assemblies may be positioned throughout the internal cabin.

Alternatively, instead of an aircraft, embodiments of the present disclosure may be used with various other vehicles, such as automobiles, buses, locomotives and train cars, seacraft, spacecraft, and the like.

In at least one embodiment, portions of the internal cabin of the aircraft are formed by composite panel assemblies 100a and 100b, as described with respect to FIGS. 1-6.

Figure 8A:
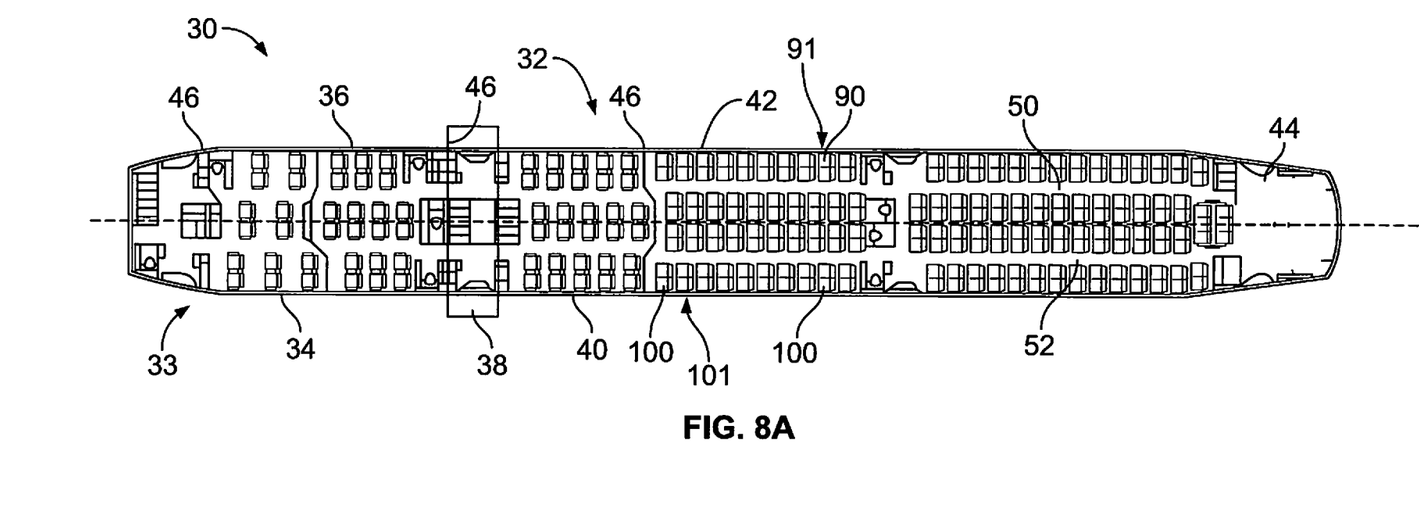
FIG. 8A illustrates a top plan view of an internal cabin of an aircraft, according to an embodiment of the present disclosure.

FIG. 8A illustrates a top plan view of an internal cabin 30 of an aircraft, according to an embodiment of the present disclosure. The internal cabin 30 may be within a fuselage 32 of the aircraft. For example, one or more fuselage walls may define an interior of the internal cabin 30. The interior of the internal cabin 30 is defined by sidewall panels that connect to a ceiling and a floor. The sidewall panels include lateral segments that connect to ceiling segments. The lateral segments define lateral wall portions, while the ceiling segments define at least portions of the ceiling within the internal cabin 30.

The internal cabin 30 includes multiple sections, including a front section 33, a first class section 34, a business class section 36, a front galley station 38, an expanded economy or coach section 40, a standard economy or coach section 42, and an aft section 44, which may include multiple lavatories and galley stations. It is to be understood that the internal cabin 30 may include more or less sections than shown. For example, the internal cabin 30 may not include a first class section, and may include more or less galley stations than shown. Each of the sections may be separated by a cabin transition area 46.

As shown in FIG. 8A, the internal cabin 30 includes two aisles 50 and 52 that lead to the aft section 44. Optionally, the internal cabin 30 may have less or more aisles than shown. For example, the internal cabin 30 may include a single aisle that extends through the center of the internal cabin 30 that leads to the aft section 44.

Seat assemblies 90 are positioned throughout the internal cabin 30. The seat assemblies 00 may be arranged in rows 91.

Figure 8B:
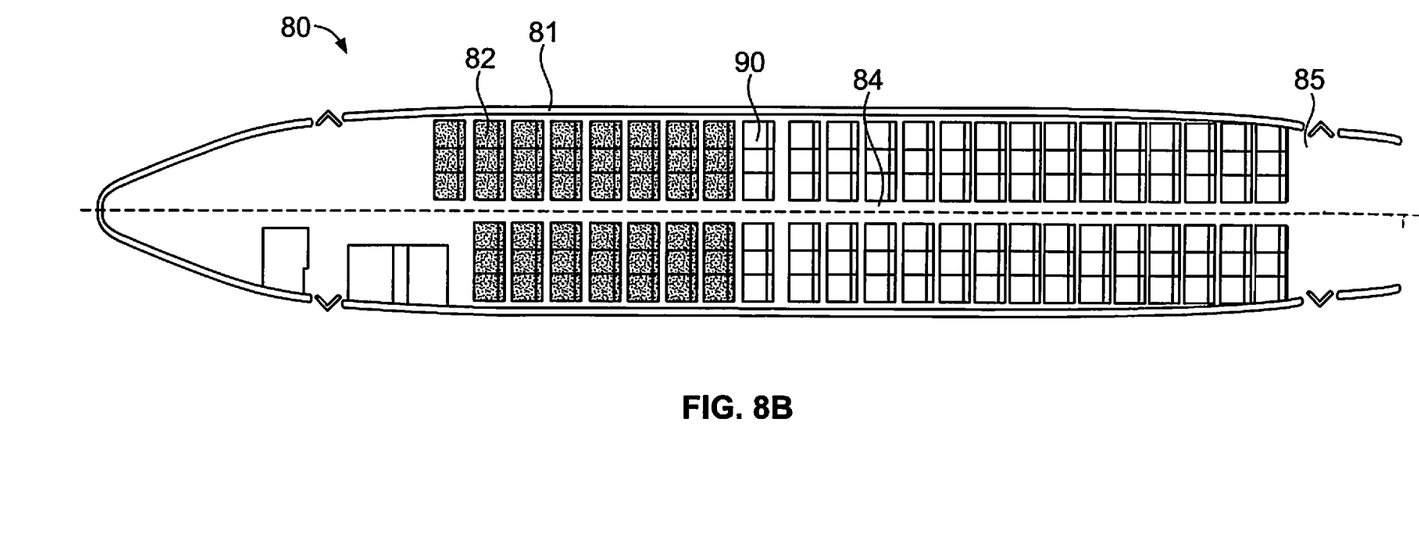
FIG. 8B illustrates a top plan view of an internal cabin of an aircraft, according to an embodiment of the present disclosure.

FIG. 8B illustrates a top plan view of an internal cabin 80 of an aircraft, according to an embodiment of the present disclosure. The internal cabin 80 may be within a fuselage 81 of the aircraft. For example, one or more fuselage walls may define the interior of the internal cabin 80. The internal cabin 80 includes multiple sections, including a main cabin 82 having passenger seat assemblies 90, and an aft section 85 behind the main cabin 82. It is to be understood that the internal cabin 80 may include more or less sections than shown.

The internal cabin 80 may include a single aisle 84 that leads to the aft section 85. The single aisle 84 may extend through the center of the internal cabin 80 that leads to the aft section 85. For example, the single aisle 84 may be coaxially aligned with a central longitudinal plane of the internal cabin 80.

In at least one embodiment, portions of the internal cabins 30 (shown in FIG. 8A) and 30 (shown in FIG. 8B) of the aircraft are formed by composite panel assemblies 100a and 100b, as described with respect to FIGS. 1-6.

Figure 9:
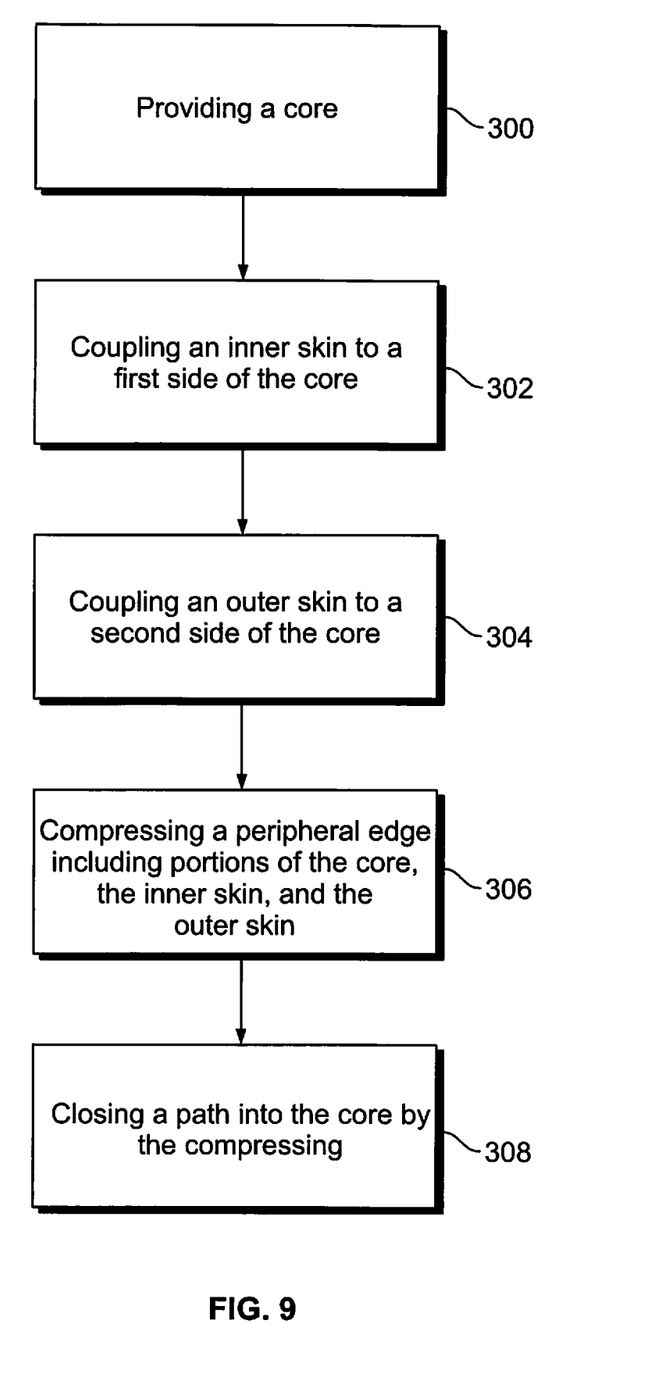
FIG. 9 illustrates a flow chart of a method of forming a composite panel assembly, according to an embodiment of the present disclosure.

FIG. 9 illustrates a flow chart of a method of forming a composite panel assembly, according to an embodiment of the present disclosure. The method includes providing (300) a core, coupling (302) an inner skin to a first side of the core, coupling (304) an outer skin to a second side of the core, compressing (306) a peripheral edge including portions of the core, the inner skin, and the outer skin, and closing (308) a path into the core by the compressing (306).

In at least one embodiment, the method also includes coupling a decorative laminate to the inner skin. The compressing also includes compressing a portion of the decorative laminate.

In at least one embodiment, the compressing includes rounding the peripheral edge. In at least one embodiment, the compressing includes bending the peripheral edge.

The method may also include coupling the composite assembly to another composite assembly with a closeout spline. In at least one embodiment, the method also includes wedging a distal end of the peripheral edge between an interior surface of an upstanding wall of the closeout spline and an exterior surface of a covering rib of the closeout spline.

As described herein, embodiments of the present disclosure provide faster, cheaper, and more efficient methods of a forming composite panel assembly. Embodiments of the present disclosure provide systems and methods for efficiently covering a peripheral edge of a composite panel. Further, embodiments of the present disclosure provide systems of methods for automatically covering a peripheral edge of a composite panel, such as via a forming system.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A composite panel assembly, comprising:
a core;
an inner skin coupled to a first side of the core;
a decorative laminate coupled to the inner skin; and
an outer skin coupled to a second side of the core,
wherein a peripheral edge including portions of the core, the inner skin, the decorative laminate, and the outer skin, is compressed.

2. The composite panel assembly of claim 1, wherein the core is a honeycomb core including a plurality of interconnected honeycomb cells.

3. The composite panel assembly of claim 1, wherein the inner skin and the outer skin include one or more pre-impregnated epoxy layers.

4. The composite panel assembly of claim 1, wherein the peripheral edge is rounded.

5. The composite panel assembly of claim 4, where the portions of the core, the inner skin, the decorative laminate, and the outer skin are rounded in a common direction and orientation.

6. The composite panel assembly of claim 1, wherein the peripheral edge comprises a bend.

7. The composite panel assembly of claim 1, wherein the peripheral edge is thinner than a main portion of the composite panel assembly.

8. The composite panel assembly of claim 7, wherein a closeout spline couples the composite panel assembly to another composite panel assembly.

9. The composite panel assembly of claim 8, wherein the closeout spline comprises:
an upstanding wall; and
covering ribs coupled to the upstanding wall.

10. The composite panel assembly of claim 9, wherein a distal end of the peripheral edge is wedged between an interior surface of the upstanding wall and an exterior surface of one of the covering ribs.

11. The composite panel assembly of claim 1, wherein the portions of each the core, the inner skin, the decorative laminate, and the outer skin, are compressed.

12. A method of forming a composite panel assembly, the method comprising:
providing a core;
coupling an inner skin to a first side of the core;
coupling a decorative laminate to the inner skin;
coupling an outer skin to a second side of the core; and
compressing a peripheral edge including portions of the core, the inner skin, the decorative laminate, and the outer skin.

13. The method of claim 12, wherein the core is a honeycomb core including a plurality of interconnected honeycomb cells, and wherein the inner skin and the outer skin include one or more pre-impregnated epoxy layers.

14. The method of claim 12, wherein the compressing comprises rounding the peripheral edge.

15. The method of claim 14, wherein the rounding comprises rounding the portions of the core, the inner skin, the decorative laminate, and the outer skin in a common direction and orientation.

16. The method of claim 12, wherein the compressing comprises bending the peripheral edge.

17. The method of claim 12, further comprising coupling the composite panel assembly to another composite panel assembly with a closeout spline.

18. The method of claim 17, further comprising wedging a distal end of the peripheral edge between an interior surface of an upstanding wall of the closeout spline and an exterior surface of a covering rib of the closeout spline.

19. A composite panel system, comprising:
a first composite panel assembly; and
a second composite panel assembly, wherein each of the first composite panel assembly and the second composite panel assembly comprises:
a core;
an inner skin coupled to a first side of the core;
a decorative laminate coupled to the inner skin; and
an outer skin coupled to a second side of the core,
wherein a peripheral edge including portions of the core, the inner skin, the decorative laminate, and the outer skin, is compressed.

20. The composite panel system of claim 19, wherein the first composite panel assembly is separated from the second composite panel assembly by a gap.

21. The composite panel system of claim 20, further comprising a closeout spline that couples the first composite panel assembly to the second composite panel assembly, wherein the closeout spline comprises:
an upstanding wall; and
covering ribs coupled to the upstanding wall, a distal end each of the peripheral edges is wedged between an interior surface of the upstanding wall and exterior surface of one of the covering ribs.

* * * * *